F. HODGKINSON.
PACKING.
APPLICATION FILED MAY 24, 1918.
1,419,927.
Patented June 20, 1922.
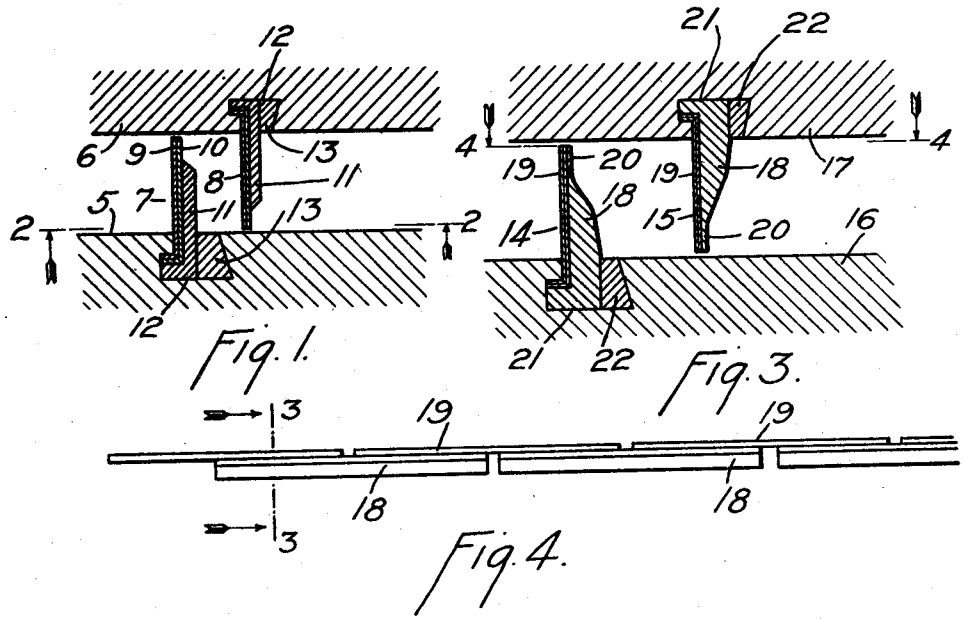

UNITED STATES PATENT OFFICE.

FRANCIS HODGKINSON, OF EDGEWOOD, PENNSYLVANIA, ASSIGNOR TO WESTINGHOUSE ELECTRIC & MANUFACTURING CO., A CORPORATION OF PENNSYLVANIA.

PACKING.

1,419,927. Specification of Letters Patent. Patented June 20, 1922.

Application filed May 24, 1918. Serial No. 236,415.

*To all whom it may concern:*

Be it known that I, FRANCIS HODGKINSON, a subject of the King of Great Britain and Ireland, and a resident of Edgewood, in the county of Allegheny and State of Pennsylvania, have made a new and useful Invention in Packings, of which the following is a specification.

This invention relates to packing and has for an object to produce a new and improved packing of the labyrinth type.

A further object is to produce a labyrinth packing which is stronger than other packings now in use and known to me and which permits less leakage.

A further object is to produce a new and improved packing which is divided so as to allow for expansion, but which is so arranged that leakage is substantially eliminated at the points of division.

A further object is to produce a labyrinth packing made up of segmental laminations arranged so that the gaps between the segments do not coincide and which is capable of packing against high pressures.

These and other objects are attained by means of packings embodying the features of my invention herein described and illustrated in the drawings accompanying and forming a part hereof.

Labyrinth packings are frequently employed in turbines, for example, for packing the joint between a dummy piston or a shaft and the turbine casing. A common form of labyrinth packing consists of a series of segmental rings mounted alternately on the members to be packed and each adapted to nearly touch the member opposite the one on which it is mounted. The rings are frequently made segmental so as to allow for expansion. It has been found that undesirable leakage occurs through the gaps between adjacent segments. An improved construction obviates this difficulty as it consists of packing rings, each built up of two laminations or thin rings divided into segments, but spaced with relation to each other so that the gaps between the segments do not coincide. This construction prevents leakage between the segments, but has the disadvantage that it cannot withstand high steam pressures unless the laminations are made undesirably thick.

My invention contemplates a labyrinth packing which is expansible, strong and has a thin wearing tip, is easy to manufacture, and in which leakage between the segments is practically prevented. According to one embodiment of my invention, thes advantages are obtained by employing a laminated ring, as described above, reinforced by a suitable backing to enable the packing to withstand high pressures. With such a construction thin laminations may be safely employed for any pressure.

In the drawings: Fig. 1 is a diagrammatic sectional view of a packing embodying the features of my invention, the section being taken along the line 1—1 of Fig. 2.

Fig. 2 is a view along the line 2—2 of Fig. 1.

Fig. 3 is a sectional view along the line 3—3 of Fig. 4 and shows a modification of the packing illustrated in Fig. 1.

Fig. 4 is a view along the line 4—4 of Fig. 3.

In Fig. 1 of the drawings I have shown a packing for preventing the leakage of fluid between two members 5 and 6, one or both of which may be movable. Annular packing rings 7 are mounted on the member 5 and, as shown, extend radially nearly to the member 6. Similarly packing rings 8 are mounted on the member 6 and extend nearly to the member 5. The rings 7 and 8 are preferably mounted alternately on the members 5 and 6, so that fluid in trying to work its way through the packing must follow a tortuous path although they may all be mounted on one member for some work. Any number of rings may be employed. As shown but little clearance is allowed between the free edge of each ring 7 and 8 and the opposite members 5 and 6, so that the fluid is wire drawn in working past each ring and is subjected to a loss of pressure, as is well known to those skilled in the art.

As shown, each member 7 or 8 is made up of two thin laminations 9 and 10, each lamination being made up of thin segments so as to allow for expansion. The segments are preferably stamped or rolled out of sheet metal. The laminations are arranged, as shown in Fig. 2, with the gaps between segments not coinciding. Leakage through the gaps is thereby practically prevented. The laminations are preferably made thin so that they will deflect or wear away easily in case the clearance between the packing rims and the members packed is disturbed. In order to enable thin laminations to be employed and yet have the packing rings capable of resisting high pressure differences. I have shown a reinforcing or pressure resisting ring 11 made of heavier material than the laminations and adapted to bear against and support them. As shown, the ring 11 is somewhat narrower radially than the rings 9 and 10, therefore there is little possibility of its free edge coming in contact with the members 5 and 6. It is, however, of sufficient radial width to support the laminations but not of such width as to affect the free wearing characteristics of the projecting edges of the packing rings.

As shown in Fig. 1, the laminations 9 and 10 and the reinforcing members 11 are flanged at their fixed edges and secured in undercut grooves 12 in the members 5 and 6 by means of caulking pieces 13. The caulking pieces 13 also hold the laminations and the reinforcing members together.

In Fig. 3, I have shown a modification of the packing illustrated in Fig. 1. As illustrated, packing rings 14 and 15 are adapted to prevent leakage between two members 16 and 17. Each packing ring is shown as made up of a segmental ring 18 of considerable strength and a segmental lamination 19, which is arranged to cover the gaps between the segments of the ring 18 (see Fig. 4). I have shown the free edge of the segmental ring 18 as reduced in cross-section, so as to provide a wearing tip. These packing rings are shown as mounted in the same manner as the rings shown in Fig. 1, that is, they are located in an undercut groove 21, in which they are secured and held in place by means of caulking strips 22.

The packing illustrated is of simple construction, is fluid tight, and is provided with wearing tips to prevent overheating or damage in case the clearances are disturbed.

While I have illustrated and described but two embodiments of my invention, it will be apparent to those skilled in the art that various modifications, changes, additions and omissions may be made in the apparatus described and illustrated without departing from the spirit and scope of the invention, as set forth by the appended claims.

What I claim is:

1. A packing comprising a mounting member, a rigid pressure resisting segmental ring and means for preventing leakage through the gaps between segments of said ring consisting of a plurality of flexible segmental laminations arranged so that the gap between the said segments are not coincident.

2. In a packing ring, a segmental pressure resisting ring and a plurality of thin segmental rings arranged so that the gaps between segments in one ring do not coincide with the gaps in adjacent rings, and means for rigidly securing the said rings against relative radial displacement.

3. A packing comprising a plurality of packing rings, each made up of a segmental pressure resisting ring and at least one segmental lamination covering the gaps between segments in said ring, said ring and lamination having a mounting flange formed thereon, a grooved member on which the rings are mounted, and means for holding the rings in place and for holding together the elements of each ring.

4. In a packing ring, a pressure resisting segmental ring comprising overlapping packing segments arranged so as to form a continuous packing ring and having certain segments increasing in thickness from the wearing edge toward the supported edge.

5. In a packing, a pressure resisting ring comprising a plurality of thin flexible annular packing members and a rigid supporting member for the packing members, the rigid member increasing in thickness from the wearing edge toward the supported edge.

6. A radially extending annular packing between two relatively rotatable elements, comprising a flexible packing strip mounted on one of said elements and extending into close proximity with the other element, and a lateral rigid reinforcing member for said strip formed in segmental sections and mounted on said first mentioned element.

7. A radially extending annular packing between two relatively rotatable elements, comprising a plurality of thin segmental packing strips located in overlapping relation and mounted on one of said elements, and a lateral rigid segmental supporting member for said strips mounted on said element.

8. An annular packing between two relatively movable elements comprising a plurality of thin segmental packing strips mounted in a groove formed in the peripheral face of one of said elements and extending into close proximity with the other member, and a lateral segmental supporting member for said strips mounted in said groove.

9. In combination with two relatively rotatable elements, an annular packing comprising a plurality of thin segmental packing strips located in over-lapping relation and mounted in a peripheral groove formed in one element and extending into close proximity with the other element, and a lateral segmental supporting member for said packing strips formed in segmental sections and mounted in said groove.

In testimony whereof, I have hereunto subscribed my name this 22nd day of May, 1918.

FRANCIS HODGKINSON.

Witness:
C. W. McGHEE.